United States Patent [19]

Zimmerman et al.

[11] Patent Number: 4,940,012

[45] Date of Patent: Jul. 10, 1990

[54] MOLD COATING APPARATUS WITH AIR FLOW CONTROL NUMBERS

[75] Inventors: Richard J. Zimmerman, Grand Rapids, Mich.; Phillip R. Barnett, Amherst; Larry Suter, Concord, both of Ohio

[73] Assignee: Nordson Corporation, Westlake, Ohio

[21] Appl. No.: 945,493

[22] Filed: Dec. 23, 1986

[51] Int. Cl.⁵ ............................................. B05B 15/04
[52] U.S. Cl. ...................................................... 118/301
[58] Field of Search ................ 118/301, 308, 317, 504, 118/635, 63; 239/290, 299; 264/309; 425/90, 100, 218

[56] References Cited

U.S. PATENT DOCUMENTS

| | | | |
|---|---|---|---|
| 2,088,542 | 7/1937 | Westin | 239/290 |
| 2,946,696 | 7/1960 | Lopenski . | |
| 2,953,483 | 9/1960 | Torok . | |
| 3,314,163 | 4/1967 | Kohler | 118/63 X |
| 3,367,789 | 2/1968 | Mommsen | 118/301 X |
| 3,377,984 | 4/1968 | Mommsen et al. | 118/301 X |
| 3,672,927 | 6/1972 | Spiller et al. . | |
| 3,857,363 | 12/1974 | Ferlito | 118/300 |
| 4,106,429 | 8/1978 | Phillips | 118/63 |
| 4,205,028 | 5/1980 | Brueggemann et al. . | |
| 4,359,964 | 11/1982 | Johnson | 118/63 |
| 4,472,451 | 9/1984 | Mulder | 118/301 X |

FOREIGN PATENT DOCUMENTS

| | | |
|---|---|---|
| 321568 | 2/1971 | Austria . |
| 0116843 | 8/1984 | European Pat. Off. . |
| 2129157 | 12/1971 | Fed. Rep. of Germany . |
| 2620708 | 11/1977 | Fed. Rep. of Germany . |
| 1180308 | 6/1959 | France . |
| 2415146 | 8/1979 | France . |
| WO83/03220 | 9/1983 | PCT Int'l Appl. . |
| 2079667 | 6/1981 | United Kingdom . |

OTHER PUBLICATIONS

International Search Report (from corresponding PCT appln.).
Patent abstract of Japan, vol. 10, No. 331 (M-533) (2387) of Jun., 1986.

*Primary Examiner*—Shrive Beck
*Assistant Examiner*—Alain Bashore
*Attorney, Agent, or Firm*—Wood, Herron & Evans

[57] ABSTRACT

A mask for providing and protecting the shear edge of a mold from contact with oversprayed powder directed onto the wall of the mold cavity. The mask comprises an air flow duct having an opening located adjacent the shear edge of the mold. First and second air flow control members are adjustably mounted upon the duct adjacent the air flow opening. The first and second air flow control members have opposed edges spaced apart so as to define an air flow gap therebetween, which air flow gap is operable to direct an airstream from said duct onto the shear edge of the mold so as to effectively mask that shear edge from powder sprayed onto the cavity defining portion of the wall of the mold.

11 Claims, 1 Drawing Sheet

MOLD COATING APPARATUS WITH AIR FLOW CONTROL NUMBERS

BACKGROUND OF THE INVENTION

This invention relates to the coating of molded products, and more particularly to the spraying of a powder coating onto the interior surface of a mold prior to the use of that mold in the forming of a molded product.

It is now common practice to mold sheet molding compound, often referred to as "SMC," within pressurized molds. Such parts are commonly manufactured from bulk resin material having very substantial fiber content. This molding technique is widely used for high volume production of large plastic parts. A characteristic of parts molded from sheet molding compound, though, is that they have very poor surface quality. In order to improve that surface quality, it has been suggested to coat the mold interior surface with a powder coating which, when the mold is subsequently filled with sheet molding compound and that compound is cured, forms a surface coating on the resulting product.

The powder coating is a powdered thermosetting resin which is generally sprayed onto the interior heated surface of the mold before the mold is filled. The temperature of the mold, which is generally on the order of 250° F. to 350° F., melts the powder, causing it to flow and then to partially set or cure. When a sheet molding compound or bulk resin is subsequently added to the mold and the mold is heated to cure the bulk resin, the resin of the coating, as well as the bulk resin, cure so as to interact the two resins into one integral product having a smooth, attractive outer surface or skin.

This process and technique for molding sheet molding compound and for applying a powder coating skin to the resulting product is described in U.S. Pat. No. 4,205,028. Equipment for practicing this process is disclosed in U.S. Pat. No. 4,472,451.

In the spraying of powder coating materials, a problem occurs in confining the sprayed powder to the mold cavity and in preventing the buildup of powder on hot surfaces of the mold external to the mold cavity. Such molds commonly have shear edges at the interface of the male and female halves of the mold, and it is these shear edges which are particularly vulnerable to becoming coated with a buildup of sprayed powder material. In the above-identified U.S. Pat. No. 4,472,451 there is disclosed apparatus for protecting the shear edge of the mold from becoming coated with powder directed onto the interior mold surface. That apparatus comprises a mask in the form of a shield having a knife edge placed in close proximity to, but spaced from, the shear edge of the mold. That knife edge and a flexible seal spaced from the knife edge, together with a surface upon which the flexible seal and knife edge are mounted, define a conduit through which air is directed to a slot defined between the shear edge of the mold and the knife edge of the shield. This airstream protects the shear edge of the mold from becoming coated and prevents undesirable buildup of powder coating material on the shear edge of the mold.

The use of the apparatus disclosed in the above-identified U.S. Pat. No. 4,472,451 requires a seal between the mold and the mask in order to effectively protect the shear edge of the mold from oversprayed powder. In the absence of a seal, air leakage occurs, and an airstream is not properly directed at sufficient velocity onto the shear edge. This can result in powder building up upon the shear edge. That buildup of powder could then result in failure of the mold to properly close and seal.

SUMMARY OF THE INVENTION

It has therefore been an objective of this invention to provide an improved apparatus for protecting the shear edge of a mold surface from becoming coated with powder directed onto the interior surface of the mold.

Still another objective of this invention has been to provide an improved apparatus for powder coating the interior surface of a mold while maintaining a sharp line of demarcation between the powder spray coated mold interior surface and the powder-free shear edge of the mold so as to maintain the shear edge of the mold.

The invention of this application which accomplishes these objectives comprises a mask in the form of an air transport duct having an opening in the duct located in close proximity to the shear edge of the mold. Mounted upon the duct are a pair of adjustable air flow control members having opposed edges defining an air flow gap therebetween. Air transported through the duct to this gap is directed onto the shear edge of the mold. Because the air flow control members are adjustable with respect to the duct and with respect to one another, it is possible to tailor the configuration of the gap to the particular application. In addition, the gap defining edges of the adjustable air flow control members may have various shapes, such as flat or knife edges, as well as rounded or contoured edges, to produce a particular desired air flow characteristic onto the shear edge of the mold so as to keep that shear edge completely free of powder sprayed onto the interior surface of the mold. Furthermore, by transporting the air flow to the gap through a duct having a seal mounted on the top thereof, the air flow may be more securely contained and the entire structure made more structurally sound than is possible with the apparatus disclosed in U.S. Pat. No. 4,472,451 upon which this invention is an improvement.

The primary advantage of this invention is that it provides an improved apparatus for maintaining the shear edge of a mold completely free of powder sprayed onto the interior surface of the mold. The apparatus is so constructed that powder does not build up on the apparatus, and therefore the shear edge of the mold need not be periodically cleaned.

It is within the scope of this invention to utilize the apparatus of this invention in association with molding processes other than sheet molding compound processes, as for example, injection molding, compression molding, rotational molding, pour molding, etc. It is also within the scope of this invention to use this apparatus to shield other powders, as for example, metals, ceramics, non-metallics, thermoplastic resins, as well as thermosetting resins and combinations thereof, from a sprayed surface, whether this surface is heated or is a portion of a mold.

BRIEF DESCRIPTION OF THE DRAWINGS

These and other objects and advantages of this invention will become more readily apparent from the following description of the drawings in which.

DESCRIPTION OF THE PREFERRED EMBODIMENT(S)

Figure 1:
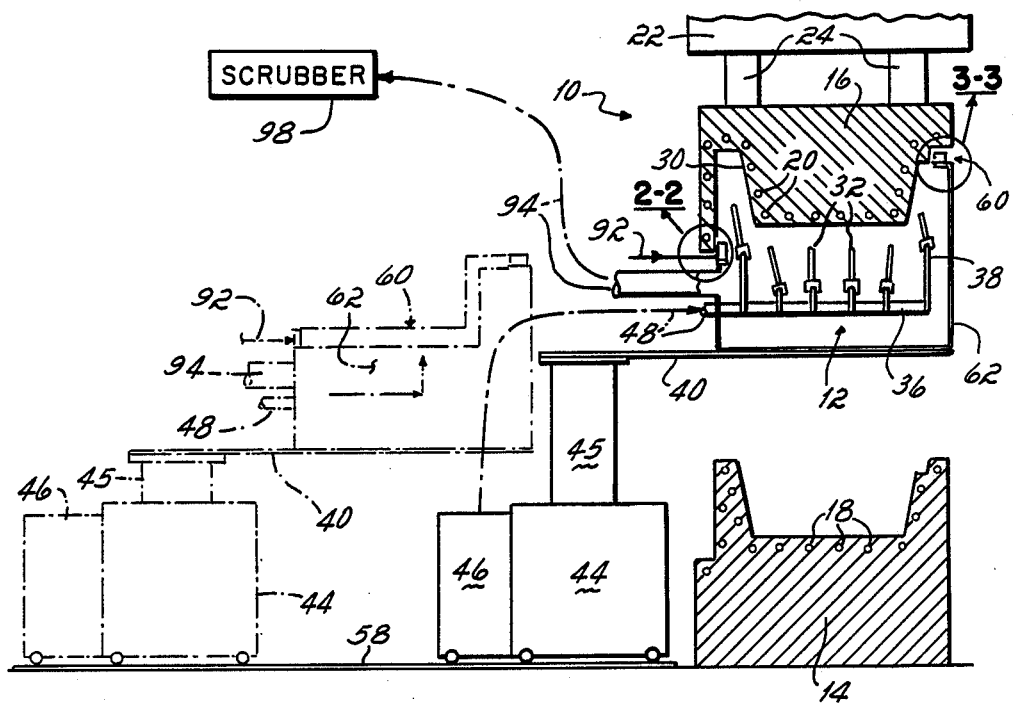
FIG. 1 is a partially diagrammatic, cross-sectional view of a sheet molding compound apparatus incorporating the invention of this application.

Referring first to FIG. 1, there is illustrated in partially diagrammatic form a molding apparatus 10 incorporating the novel powder spray apparatus 12 of this invention. The molding apparatus 10 is conventional for molding a sheet molding compound. It comprises a mold base 14 cooperable with a molding unit or die 16 to form a mold cavity therebetween. In use, sheet molding compound is placed over the mold base and the die is closed relative to the base so as to create a die cavity therebetween. The mold and the mold base are heated by conventional electrical resistance heaters 18, 20 in the base and die, respectively, so as to cure the compound contained within the die cavity. Generally, the mold is heated to a temperature on the order of 250°–350° F. to effect curing of the sheet molding compound.

In the illustrated embodiment, movement of the mold or die 16 relative to the mold base is effected by movement of the mold top 22 toward the mold base or by cylinders 24 in the mold top moving the die 16 toward the mold base. Whether the die is moved by the cylinders 24 or by movement of the mold top is of no importance to the invention of this application since the mold and dies are all conventional and per se form no part of the invention of this application.

The invention of this application is concerned with apparatus for coating the interior surface 30 of the molding unit or die 16 with a resinous powder coating sprayed onto the interior surface from spray guns 32. It is known that the powder spraying of a resinous powder material onto the interior surface 30 of the mold before the mold is closed has the effect of creating a coating upon the resulting sheet molding compound product which is superior to the surface otherwise created in the absence of the resinous powder. As explained in the above-identified U.S. Pat. No. 4,472,451, the application of this powder to the inside of the mold has been a problem because of the powder overspray contacting and building upon the surface of the mold outside the mold cavity. This problem is particularly acute on the shear edge 34 of the mold. The shear edge is that portion of the mold or die which contacts a mating surface of the mold base so as to close and seal the mold cavity. The buildup of coating material upon the shear edge acts as a barrier to closing of the mold with the result that the molded product is improperly sized, shaped, etc.

In order to apply powder to the inside surface of the mold, the apparatus 10 employs multiple spray guns 32 adjustably mounted upon a reciprocating gun support arm 36. These powder spray guns are operative to supply air entrained powder from the guns toward the surface 30 of the mold. In the illustrated embodiment, multiple guns are employed so as to effect complete surface coverage of the interior surface of the mold. The guns 32 are conventional electrostatic spray guns mounted by means of conventional adjustable brackets 38 upon the supporting arm 36. In the use of such conventional guns, very fine particulate powder material is sprayed from the guns, and in the course of passage from the guns, has an electrostatic charge applied thereto. The mold or die to which the powder is applied is grounded so that the electrostatic charge in the powder causes the powder to contact and adhere to the mold. Upon coming into contact with the heated mold, the powder melts or fuses and becomes partially cured as a coating over the interior surface of the mold.

In order to effect movement of the guns into vertical alignment with the underside of the mold cavity surface 30, the gun supporting arm 36 is mounted upon a horizontally and vertically adjustable frame 40. This frame 40 is in turn secured to a hydraulic cylinder 45 of a movable base 44. The cylinder 45 is operative to effect vertical movement of the gun mounting frame 40 relative to the movable base 44. The movable base 44 is in turn mounted upon a track 58 for movement toward and away from the mold base.

Attached to the movable base 44 is a powder feeder 46 operable to supply air entrained powder from a reservoir (not shown) contained interiorly of the feeder through a powder feed hose 48 to the guns 32. The powder feeder 46 and feed hose for supplying the air entrained powder to the guns are conventional and are well known in the powder spray art and therefore have not been described in detail in this application.

The movable base 44 and attached powder feeder are movable upon the track 58 between an inner position, illustrated in solid lines in FIG. 1, wherein the guns are vertically aligned with the mold cavity, and an outer position, illustrated in phantom in FIG. 1, wherein the guns have been lowered and retracted and are out of alignment with the mold cavity such that the mold unit 16 may be closed without interference from the spray guns and powder spray unit 12.

The apparatus heretofore described is all conventional and per se forms no part of the invention of this application. This much of the apparatus of this invention is fully described in the above-identified U.S. Pat. No. 4,472,451.

The invention of this application is concerned with that portion of the apparatus which prevents the buildup of powder on the shear edge 34 of the mold and with the portion of the apparatus concerned with the entrapment of oversprayed powder and the prevention of that oversprayed powder from escaping to atmosphere. To the end of preventing powder from contact the shear edge 34 of the mold unit 16, there is a mask 60 surrounding the spray guns 32. This mask 60 is mounted upon the top edge of a powder box 62, which is in turn mounted upon the frame 40. The connection is such that when the frame 40 is moved upwardly relative to the base by the hydraulic cylinder or motor 45, the powder box 62 and mask 60 move with it.

Figures 2, 3:
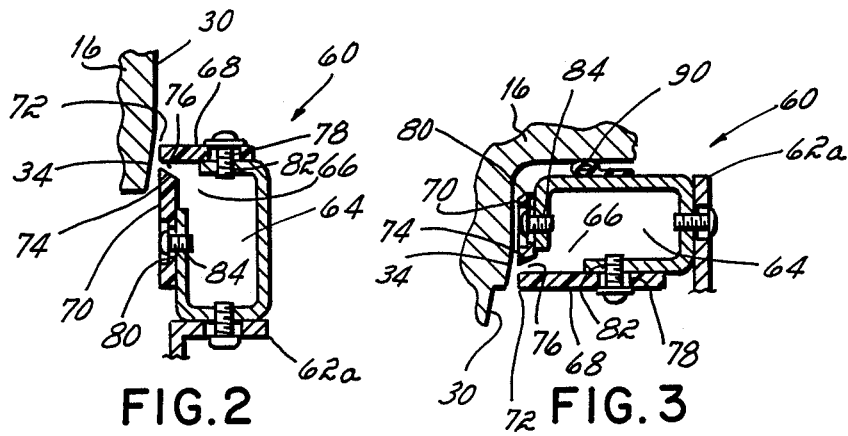
FIG. 2 is an enlarged cross-sectional view of the portion of the apparatus encircled by the line 2—2 of FIG. 1.
FIG. 3 is an enlarged cross-sectional view of the portion of the apparatus encircled by the line 3—3 in FIG. 1.

With reference to FIGS. 2 and 3, it will be seen that the mask 60 comprises a generally rectangular cross section air flow duct 64 having an opening 66 at one corner thereof. This opening 66 is located adjacent to but spaced from the shear edge 34 of the mold unit 16. As may be seen most clearly in FIG. 1, this duct or air flow conduit 64 extends completely around the edge of the mold unit 16 and generally conforms in shape to the configuration of that shear edge. The duct 64 is mounted atop a flange 62a of the powder box 62.

Mounted on adjacent sides of the generally rectangular cross section duct or air flow conduit 64 are a pair of adjustable air flow control members 68, 70. These air flow control members are mounted upon adjacent sides of the rectangular duct 64 and have portions thereof extending over the opening 66. These members 68, 70 also have opposed edges 72, 74 located in close adjacency and defining therebetween an air flow gap 76 through which air is directed onto the shear edge 34 of the mold.

In the illustrated preferred embodiment, one of the air flow control members 68 has a blunt or flat edge 72, and the other air flow control member 70 has a knife edge 74. This combination of edges has been found to be very effective for defining the gap 76 through which air is directed from the duct 64 onto the shear edge 34. Other configurations of edges, though, as for example round or contoured edges, may be used to produce particular air flow patterns and characteristics for protecting particular configurations of mold shear edge surfaces.

Both air flow control members 68, 70 have slots 78 and 80 formed therein. Machine screws extend through these slots and are threaded into threaded bores 82, 84 of the duct 64 so as to adjustably secure the air flow control member 68, 70 onto the duct. This adjustable attachment of the air flow control members to the duct enable the gap 76 between the opposed edge of the members 68, 70 to be adjusted and accurately positioned so as to obtain a desired air flow pattern operative to maintain the shear edge 34 of the mold 16 free of powder.

With reference to FIG. 3, it will be seen that in one preferred embodiment, there is a flexible seal 90 mounted on the top of the duct 64. This seal is engageable with the underside of the mold unit 16 so as to press against the mold surface and compress the seal when the frame 40, mold box 62 and duct 64 are moved upwardly into position relative to the mold. The flexible seal 90 has been omitted from FIG. 2 because in some instances there is no need for such a seal.

In use, the powder spray system 10 is moved from a withdrawn position illustrated in phantom in FIG. 1 to a position of alignment with the mold unit 16. After the powder spray system is moved into this aligned position with the mold cavity, the spray guns 32, powder box 62, and attached mask 60 are moved upwardly by the reciprocator 45 to a position in which the spray guns 32 are located in proximity to the mold cavity and adjacent to the surface 30 of the mold unit 16. In the course of moving the mask 60 upwardly, the opposed edges of the air flow control members 68, 70 attached to the duct 64 move into close adjacency to the shear edge of the mold 16 with the gap 76 defined between these edges positioned so as to direct an airstream from the duct onto the shear edge. With the guns and mask so located, air is supplied under pressure above that of the atmosphere through an air line 92 (FIG. 1) to the interior of the duct 64. This high pressure air results in an airstream being directed from the interior of the duct through the gap 76 defined by the edges of the air flow control member 68 and 70, onto the shear edge 34 of the mold unit 16. The air pressure stream moving through this gap maintains a sufficient air flow to preclude air entrained powder within the mold cavity from moving through the slot into contact with the shear edge 34 of the mold unit 16.

Simultaneously with the supply of high pressure air to the duct 64, a vacuum is drawn through a conduit 94 from the interior of the powder box 62. After this vacuum is established, the spray guns are turned on and reciprocated so as to direct a stream of air entrained powder toward the inside surface of the mold cavity.

The mold or die 16 is at that time at a temperature above 200° F., and preferably at a temperature on the order of 300° F. At this temperature, powder emerges from the guns and moves into contact with the surface of the mold. Most of the powder melts and becomes securely attached to the surface of the mold.

Not all powder sprayed from the guns 32 moves directly onto the surface 30 of the mold or die 16. Some of the powder becomes entrained in the air surrounding the guns to form a dust cloud interiorly of the powder box 62. So much of this dust cloud as does not become adhered to the surface of the mold is transported through the powder box and the vacuum conduit 94 to a powder recovery system or, in the preferred embodiment, to a scrubber 98. Scrubber 98 includes a water spray section to knock the powder out of the air into a collection reservoir from which it can be removed by a skimming device.

After the surface 30 of the mold or die has been completely coated with sprayed powder, the spray of powder from the guns 32 is terminated and once the spray box has been evacuated of oversprayed powder, the mask and vacuum air are turned off. The guns 32, mask 60 and powder box 62 are then lowered and moved outwardly on the track 58 to a position out of alignment with the mold unit or dies 16. Thereafter, the mold is filled with sheet molding compound and the die closed. The resin contained in the sheet molding compound is then cured by heating of the mold. In the course of curing the sheet molding compound, the resin of the powder coating contained within the mold cavity reacts with the resin of the sheet molding compound to form an integral molded product.

While we have described only one preferred embodiment of our invention, persons skilled in this art will appreciate numerous modifications and changes which may be made without departing from the spirit of our invention. Therefore, we do not intend to be limited except by the scope of the following appended claims:

We claim:

1. Apparatus for coating a molded article comprising:
 a first mold member,
 a second mold member movable into engagement with said first mold member,
 one of said mold members being retractable from and movable into engagement with the other mold member,
 said mold members having facing wall portions defining a cavity when said mold members are interengaged, said mold members having shear edges, said shear edges being interengageable when said molds are moved into interengagement,
 apparatus for depositing a powder material against a cavity defining portion of the wall of at least one of said mold members,
 said powder depositing apparatus including a spray gun and means for flowing said powder material from said spray gun,
 a movable frame,
 said spray gun being mounted upon said movable frame,
 means for moving said frame to align and misalign said spray gun with said cavity defining portion of the wall of said first mold member,
 means for masking the shear edge of said first mold member from the cavity defining portion of the wall of said first mold member, said masking means being mounted upon said movable frame, said masking means comprising an air flow duct, said duct having side walls defining an air flow chamber contained internally thereof, said duct having an opening communicating with said chamber and located adjacent said shear edge of said first mold member, first and second air flow control members mounted upon said duct, said control members having opposed edges spaced apart so as to define an air flow gap therebetween, said air flow gap being operable to direct air flow from said duct onto said shear edge of said first mold member so as to effectively mask said shear edge from powder sprayed onto the cavity defining portion of the wall of said first mold member.

2. The apparatus of claim 1 wherein at least one of said air flow control members is mounted for adjustment on said duct so as to enable the gap between the opposed edges of said first and second air flow control members to be adjusted and varied.

3. The apparatus of claim 2 wherein both said first and second air flow control members are adjustably mounted upon said air flow duct.

4. The apparatus of claim 1 which further includes a flexible sealing element mounted upon said duct, said flexible sealing element being movable with said frame into and out of sealing engagement with said first mold member.

5. The apparatus of claim 1 which further includes a coating box mounted on said movable frame beneath said spray gun, said coating box being movable with said frame into and out of alignment with said selected portion of the wall of said first mold member, said coating box being operable to receive oversprayed powder from said spray gun.

6. The apparatus of claim 5 which further includes vacuum means for withdrawing air entrained oversprayed powder from said coating box.

7. The apparatus of claim 6 which further includes scrubber means for extracting said oversprayed powder from the air within which it is entrained when withdrawn from said powder box.

8. Apparatus for use in connection with a first mold member and a second mold member, one of said mold members being retractable from and movable into engagement with the other mold member, said mold members having facing wall portions defining a cavity when said mold members are interengaged, said mold members having shear edges, said shear edges being interengageable when said molds are moved into interengagement, said apparatus being operable to deposit a powder material against a cavity defining portion of the wall of at least one of said mold members, said apparatus comprising a spray gun and means for flowing said powder material from said spray gun, a movable frame, said spray gun being mounted upon said movable frame, means for moving said frame to align and misalign said spray gun with said cavity defining portion of the wall of said first mold member, means for masking the shear edge of said first mold member from the cavity defining portion of the wall of said first mold member, said masking means being mounted upon said movable frame, said masking means comprising an air flow duct, said duct having side walls defining an air flow member contained internally thereof, said duct having an opening communicating with said chamber and locatable adjacent said shear edge of said first mold member, and first and second air flow control members mounted upon said duct, said control members having opposed edges spaced apart so as to define an air flow gap therebetween, said air flow gap being operable to direct air flow from said duct onto said shear edge of said first mold member so as to effectively mask said shear edge from powder sprayed onto the cavity defining portion of the wall of said first mold member.

9. The apparatus of claim 8 wherein at least one of said air flow control members is mounted for adjustment on said duct so as to enable the gap between the opposed edges of said first and second air flow control members to be adjusted and varied.

10. The apparatus of claim 9 wherein both said first and second air flow control members are adjustably mounted upon said air flow duct.

11. The apparatus of claim 8 which further includes a flexible sealing element mounted upon said duct, said flexible sealing element being movable with said frame into and out of sealing engagement with said first mold member.

* * * * *

UNITED STATES PATENT AND TRADEMARK OFFICE
CERTIFICATE OF CORRECTION

PATENT NO. : 4,940,012
DATED : July 10, 1990
INVENTOR(S) : Richard J. Zimmerman et al.

It is certified that error appears in the above-identified patent and that said Letters Patent is hereby corrected as shown below:

Col. 4, line 47, change "contact" to --contacting--.

Col. 8, line 22, change "member" to --chamber--.

Signed and Sealed this

Fifteenth Day of September, 1992

Attest:

DOUGLAS B. COMER

Attesting Officer

Acting Commissioner of Patents and Trademarks